United States Patent [19]

Jungr et al.

[11] 4,053,442
[45] Oct. 11, 1977

[54] METHOD FOR MANUFACTURING SHAPED ARTICLES FROM MULTI-BLOCK COPOLYMERS

[75] Inventors: Václav Jungr; Artur Stoy; Vladimir Stoy; Jíri Zima, all of Prague, Czechoslovakia

[73] Assignee: Ceskoslovenska akademie ved, Prague, Czechoslovakia

[21] Appl. No.: 605,509

[22] Filed: Aug. 18, 1975

[30] Foreign Application Priority Data

Aug. 28, 1974 Czechoslovakia .................. 5924/74

[51] Int. Cl.$^2$ ............................................. C08F 1/86
[52] U.S. Cl. ........................ 260/29.6 R; 260/29.6 AB; 260/29.6 AN; 260/29.6 H; 260/29.6 HN; 260/29.6 E; 260/883; 264/1; 264/206; 264/313; 264/331; 264/343; 351/160

[58] Field of Search .................. 264/1, 331, 206, 343, 264/322, 330, 313; 351/160; 260/29.6 TA, 29.6 AB, 88.7 B, 29.6 WB, 883, 29.6 H, 29.6 HN, 29.6 E, 29.6 AN; 526/303, 342

[56] References Cited

U.S. PATENT DOCUMENTS

| | | | |
|---|---|---|---|
| 3,220,960 | 11/1965 | Wichterle et al. | 351/160 |
| 3,489,491 | 1/1970 | Creighton | 264/1 |
| 3,699,089 | 10/1972 | Wichterle | 264/1 |
| 3,787,378 | 1/1974 | Blank | 260/86.1 R |
| 3,812,071 | 5/1974 | Stoy | 260/29.6 TA |
| 3,825,458 | 7/1974 | Wichterle et al. | 156/242 |
| 3,897,382 | 6/1974 | Stoy et al. | 260/88.7 B |

FOREIGN PATENT DOCUMENTS

| | | | |
|---|---|---|---|
| 2,350,528 | 7/1974 | Germany | 260/29.6 TA |

Primary Examiner—Jeffery R. Thurlow

[57] ABSTRACT

The invention relates to a new method for manufacturing shaped articles from multi-block copolymers of acrylonitrile with acrylamide and/or acrylic acid, using hot pressure molding, preferably in swelled condition.

10 Claims, No Drawings

METHOD FOR MANUFACTURING SHAPED ARTICLES FROM MULTI-BLOCK COPOLYMERS

BACKGROUND OF THE INVENTION

Multi-block copolymers of acrylonitrile with acrylamide and/or acrylic acid could be shaped, until now, but by extruding their solutions through spinnerets into a fluid medium capable of removing the solvent, i.e., by either wet or dry spinning. This method is suitable for manufacturing very thin articles only such as fibers and films. It is impossible to obtain other exactly shaped articles, particularly thick-walled ones, because of distortion caused by non-uniform elution or evaporation of the solvent from the coagulated polymer solution. In contact with either a coagulating bath or hot gas there is always formed a "skin" through which the solvent and the coagulant cannot readily penetrate at equal rate. The skin is unable to follow the subsequent contraction of the interior of the article during further removal of the solvent and the surface gets corrugated. Moreover, uneven and irregular coagulation results in numerous microscopic voids or pores reducing the strength and transparency of the article. Fibers and thin films can be obtained without said difficulties only because the thickness of the film and the radius of the fiber cross-section are smaller than the thickness of the "skin."

It has been found now that the above mentioned soluble mutli-block copolymers, displaying in X-ray analysis the typical reflexes of polyacrylonitrile with 5.1 A periodicity and consisting in swelled state of two distinct but inseparable phases, can be molded under pressure in swelled condition, provided that the molding temperature is higher than the glass transition temperature of any polymeric phase of the system, but lower than 250° C, and provided further that the boiling of the swelling agent as well as its escaping from the mold are avoided, using either a tightly closed mold, or carrying out the molding at temperatures lower than the boiling point of the swelling agent, or using both of said measures at the same time.

The possibility of pressure molding multi-block acrylonitrile copolymers in the state of a gel or xerogel is surpising. It has been proved that said copolymers consist of two distinct but inseparable phases, one of crystalline /or quasi-crystalline/ polyacrylonitrile, the other of amorphous solvated polymer - either polyacrylamide, or polyacrylic acid, or their mixture. In any macromolecule there are several "blocks" or segments of both sorts of polymer; upon coagulation, polyacrylonitrile segments of neighboring macromolecules agglomerate and the two phases separate. As each macromolecular chain contains several polyacrylonitrile and several hydrophilic segments, it participates in building several different regions of the two kinds. forming thus a network structure the knots of which are crystalline polyacrylonitrile domains. Said knots are very strong due to strong polar intermolecular forces of nitrile side-groups, and as long as the temperature does not exceed the glass transition point of polyacrylonitrile, while the swelled amorphous domains are above their glass transition temperature, the swelled copolymer possesses usual characteristics of an elastomer, cross-linked by covalent bonds, only the cross-links are polyacrylonitrile domains held together by dipoles. Unlike random copolymers, in the multi-block acrylonitrile copolymers the crystalline polyacrylonitrile structure is clearly visible on the X-ray pattern even if the content of nitrile groups is very low. As each macromolecule traverses several domains of both kinds, the two phases cannot be separated.

It is known, however, that polyacrylonitrile cannot be melted without deterioration and that, above its glass transition temperature which is, in presence of water, 70° C, can be only oriented by stretching but not shaped or molded. There is an essential difference between orientation and molding, because during the orientation the crystalline domains are turned in the direction of the stretch as a whole, while in molding the individual macromolecules are displaced — the polymer flows. A flow can be reached in polyacrylonitrile only if the chains are solvated and separated, i.e., in a solution — melting is impossible. Therefore crystalline polyacrylonitrile can be worked only from its solutions, by spinning.

Swelled multi-block acrylonitrile copolymers, in spite of their substantial content of crystalline polyacrylonitrile which forms the knots of the network, undergo surprisingly a flow when subjected to mechanical forces at temperatures lying above the glass transition points of the two phases. This is surprising because the network is to be reorganized entirely, particularly the knots which are identical with the unmeltable polyacrylonitrile. Unlike polyacrylonitrile in bulk, the same substance in the two-phase copolymer is permanently deformable above about 70° C without any appreciable loss of strength and transparency, even without discoloration. It could not be expected that polyacrylonitrile domains in the copolymer, in which only amorphous domains are swelled, would at least temporarily dissolve when exposed to pressure or shear stress at temperatures much lower than the theoretical melting point of acrylonitrile.

The crystallinity of polyacrylonitrile is here mentioned in its usual sense, as proved by X-ray analysis where circular reflexes of the non-oriented polymer change to equatorial sickles in stretched condition, with 5.1 A periodicity. Whether this is a true crystallinity or a quasi-crystallinity, is for the purpose of the invention irrelevant.

A very important advantage of the present method is that multi-block acrylonitrile copolymers swelled to equilibrium with water can be directly molded to articles having the exact shape and size of the mold, the shape and size remaining thereafter constant in a long time contact with water or with diluted aqueous liquids.

It is necessary to compensate for the contraction caused by cooling the gel in a closed mold. This can be done, e.g., by using an elastic mold held under pressure during the cooling period. If the molding is carried out below the boiling point of the swelling agent, the molded material can be used as sealing gasket in a bipartite mold; then, the swelling agent such as hot water, serving simultaneously for heating the mold, can penetrate through the gasket into the molded gel and increase the inside pressure by increasing the volume of the molded gel, thus compensating for the contraction.

The cooling contraction can be also compensated for by using molds made from two different materials contracting by cooling in such a way that a steady pressure is maintained within the mold.

Another possibility is to use an arrangement well known in the injection molding, with a mold provided with a feeding passage or runner through which the swelled multi-block acrylonitrile copolymer, heated above the glass-transition temperature of any polymeric phase present in the system, is fed under pressure during the whole cycle including the cooling period. To ensure the homogeneity, the feeding passage as well as the adjacent part of the mold have to be kept at a sufficiently high temperature and cooled down only after the bulk of the molding has already contracted.

The forming or molding of swelled multi-block acrylonitrile copolymers can be carried out, under the above defined conditions, in any way used for thermoplastic polymers such as by pressure molding, injecting, die pressing, die casting, punching, extruding, calandering, etc.

The process of the invention makes possible to gain, in a simple and economical process, moldings having excellent physical properties of the starting rubbery hydrogels, particularly of those manufactured by controlled partial hydrolysis of polyacrylonitrile in a homogeneous acid medium. The moldings can possess any, even complicated, shape and any thickness, not attainable in the coagulation method used hitherto. If water is used as swelling agent, the size and volume of the molding is exactly that of the mold, remaining unchanged in subsequent protracted contact with water, while the working of polymer solutions in either wet or dry process is always accompanied by a change of volume and corrugation of the surface. In the present process the zero change of volume is simply reached by using, as starting material, a multi-block acrylonitrile copolymer swelled to equilibrium in water, irrespective of its swelling capacity and chemical composition.

The molding cycle is short because at sufficiently high molding temperatures the arrangement of the polymeric network and the flow of the material lasts only seconds or tens of seconds so that the molding, when removed from the mold, displays no elastic relaxation commonly known as "plastic memory." Therefore it is not necessary to use pulverized or granulated copolymer for filling the mold. On the contrary, blanks of any desired shape and of an only slightly larger volume can be used for filling the mold with the whole batch all at once. Such blanks, e.g., for soft contact lenses, can have the shape of short cylinders cut from an "endless" cylindrical strand made by extrusion of a solution of a multi-block acrylonitrile copolymer in concentrated nitric acid into water, using a nozzle with a diameter of 8 to 16 mm. The blanks can have exactly the requested weight so that the metering is highly simplified. The molding possesses all valuable characteristics of the starting rubbery hydrogel, with the advantage of extreme simplicity of the shaping process in comparison with polymerization casting of monomer mixtures or coagulating polymer solutions. There are no problems with compensating for polymerization contraction, oxygen-caused inhibition, popcorn-like irregularities on the surface, etc., as known in carrying out the polymerization casting method, or with reaching the predetermined exact size and shape by using a partially hydrolyzed polyacrylonitrile with an exact degree of hydrolysis, to avoid shrinking or swelling of the article after the removal of the solvent as known in carrying out the coagulation by washing in water.

Thus, multi-block acrylonitrile copolymers with swelling capacities ranging from 10 to about 95% of water in equilibrium can be molded using the present process, without any appreciable change of volume in a long time contact with water or with body liquids, provided that no water escaped from the mold in vapors.

High-boiling swelling agents such as glycerol are not exacting as far as the tightness of the mold is concerned, the end volume replacing glycerol in the molding with water is to be determined, however, for each degree of hydrolysis separately. The size of the molding has to be chosen accordingly. If desired, the swelling capacity of the high-boiling agent such as glycerol or diacetine can be increased by adding a limited amount of a solvent of polyacrylonitrile such as dimethyl sulfoxide, in order to adjust it to the swelling capacity in water. On the contrary, the degree of swelling of the molded material can be decreased by adding a bad swelling agent or even a coagulating agent miscible with the swelling agent used, e.g., by adding a limited amount of a lower aliphatic alcohol or ketone.

Regarding the characteristics of this type of hydrogel it is clear that the method of the invention is suitable primarily for shaping various articles of surgery such as soft contact lenses, tips of hydrogel catheters, soft, non-irritating intra-uterinal anticonception inserts, pessars, drugs containing depot implants, protheses of organs such as tendons, ear-drums, parts of middle ear organs, various cartilageous organs and similar. Another field of use are dental protheses. The method of the invention can be used, however, also for various technical applications such as sealings of water pumps and other machines immersed in water, dialysis membranes, details of diagnostic and analytical apparatusses, fishing baits etc., that is articles for any use where a rubber-like elasticity, strength and high content of water in contact with aqueous liquids are required.

Swelled multiblock copolymers of acrylonitrile are suitable for copying minute details of metallic or other surfaces onto which they are pressed at increased temperatures. Thus, the method is also suitable for making impressions, printing plates or rollers.

The shaping according to the invention results, in certain cases, in improving physical characteristic of the article; e.g. slightly turbid gels can be made entirely transparent, especially when the molding is rapidly cooled. Sometimes there is a convenient possibility of pressing a layer of a softer and more swelled hydrogel onto a less swelled, harder hydrogel, particularly in dentistry, or in molding prostheses of joints and similar. Under heat and pressure the two layers are permanently bonded together.

The unexpected flow of polyacrylonitrile domains can be perhaps explained now by that polyacrylonitrile segments of individual macromolecules cannot only be shifted within a domain, but also pass, under stress and at temperatures above the glass transition, from one domain to a neighboring one, their mobility being probably increased by adjoining highly swelled segments of, e.g., polyacrylamide and/or acrylic acid. This behavior could not be deduced, however, from the known characteristics of polyacrylonitrile.

The depth of the structural changes is visible also from the fact that even a pulverous multi-block acrylonitrile copolymer forms, under stress and at sufficiently high temperatures, a new and entirely coherent network with about the same characteristics, in swelled state, as the original hydrogel.

The shaping in non-swelled or in a but slightly swelled state can be performed at temperatures above about 110° C, preferably above 150° C the mobility of the segments is low so that the molding requires rather long time.

If, however, a swelling agent of the amorphous phase /usually polyacrylamide/ is present, such as water, glycerol, diacetine, aliphatic glycols, pyridine and similar, the molding can be carried out at considerably lower temperatures, e.g., above 70 ° C in presence of water. Still lower molding temperatures can be used if a limited amount of a solvent of polyacrylonitrile is added, without, however, changing the gel to a viscous solution at ambient temperature. This measure is, however, mostly unnecessary because water is highly preferred as swelling agent and the molding at temperatures above 70° C is quite convenient.

It is a characteristic feature of the present process that the multi-block acrylonitrile copolymer, preferably swelled, enters the process in the state of a gel or xerogel, containing demonstrable crystalline or quasi-crystalline polyacrylonitrile phase, and in the same state gets out of the process, its shape only being changed. In the methods known hitherto acrylonitrile copolymers entering the working process must not contain solid, crystalline phase of polyacrylonitrile, recognizable by X-ray analysis.

The presence of swelling agents is advantageous not only because the glass transition temperatures are decreased and the time of molding shortened, but also because swelled gels can be easily removed from the mold. Besides of water, which is preferred, also higher boiling swelling agents such as glycerol can be used, either along or in mixtures with water, to make possible molding at temperatures above 100° C without using tightly closed molds, e.g., by calandering or extrusion.

If desired, the moldings can be subsequently cross-linked using known methods, e.g., heating with acid aqueous formaldehyde solutions. Other cross-linking agents such as di-epoxides, di-isocyanates and other bifunctional compounds capable to react with the side-groups of the copolymer can be used. Thereby the heat stability of the moldings can be increased. Cross-linked hydrogels of the above described kind can be sterilized also by boiling at temperatures above 100° C. Chemical stability of the copolymers makes possible chemical sterilization with various agents such as ethylene oxide, peroxo compounds, etc.

The invention is illustrated by following non-limitative Examples. Parts and percentages are by weight if not stated otherwise.

EXAMPLE 1

15% solution of acrylonitrile in a 65% nitric acid was polymerized by adding 0.1% of di-isopropyl percarbonate and 0.1% of urea, related to the solution as a whole. After 48 hours standing at 15° C a clear highly viscous solution was obtained which was then kept for 200 hours at 8° C. The solution, heated to room temperature, was extruded through a 10 mm opening into water and the coagulating stream was drawn off at a rate of 15 cm/min. After thorough washing in water the strand, about 8.5 mm in diameter, was cut to 1 mm thick cylinders. The blanks thus obtained were put into a concave hemispherical mold heated to 95° C and pressed by means of a spherical die. The tightly closed mold, kept under pressure by means of a spring, was cooled to ambient temperature and opened. The material of the mold was polypropylene, that of the die was steel. The molding in the shape of a contact lens was washed in water, kept for 8 hours in physiologic saline and sterilized therein by adding 0.08% of hydrogen peroxide, sealing the lens in a polyethylene foil and heating it for 10 minutes in 100° C steam. The lens had about 60% water at swelling equilibrium, tensile strength 70 kg/cm$^2$, elastic elongation about 600%. The permeability for oxygen was approximately 50% higher than that of sparingly cross-linked ethylene glycol methacrylate gel, utilized for manufacturing contact lenses, and the lens could be worn for a considerably longer time.

EXAMPLE 2.

A blank prepared according to Example 1 was inserted into a hemispherical glass mold and compressed therein by means of a steel bearing ball, driven by a 20 mm rubber piston by means of a screw. The brim of the hydrogel blank formed a sealing between the concave mold and the ball. The assembly was then immersed into boiling water for two minutes, removed from the bath and left to cool to ambient temperature. During the cooling the screw was tightened. The overlapping gel was cut off, the molding removed and treated like in Example 1.

EXAMPLE 3.

20% pulverous dry polyacrylonitrile, molecular weight 185,000, prepared by usual precipitation polymerization in water, was dispersed in 45% nitric acid at 10° C. 0.5% of urea was added and the dispersion was gradually introduced into a mixer containing equal amount of 65% nitric acid, cooled down to −10° to −15° C. The mixture was stirred until the polymer entirely dissolved and reached the room temperature. The viscous solution was then kept for 8 days in a thermostat at 10° C. Thereafter it was extruded through a 1.4 mm opening into an excess of tap water at a drawing off velocity 10 m/min. The thick monofil was thoroughly washed in water and granulated by cutting. The rubbery copolymer contained 48% of water at swelling equilibrium. The grains, containing still some excessive water on their surface, were filled into a mold of the shape of an artificial heart valve, made from stainless steel, with a sealing gasket from polytetrafluorethylene between the two parts thereof. The mold was closed at 95° C, the excess of the gel being squeezed off. Then the mold was heated to 175° C, cooled and opened. The molding was sterilized with ethylene oxide and kept in sterile container filled with physiologic saline.

EXAMPLE 4

Granulated hydrogel prepared according to Example 3 was dried at 60° C in a vacuum drier and ground to a coarse powder. The powder was metered into bipartite mold, 40% of glycerol was added and the mixture was molded at 180° C. The closed mold was cooled to room temperature, the overruns removed by means of a die. The molding was homogeneous, translucent and highly elastic. It could be kept in the atmosphere for any time without loosing its physical characteristics. Before use the molding was thoroughly washed in water and sterilized in physiologic saline.

EXAMPLE 5.

The strand of swelled hydrogel prepared according to Example 1 was cut to cylinders 12mm long which were then molded in a mold to the shape of a tip of urethral catheter, with a shoulder for slipping a hydrogel tube on and with an axial opening. After having removed the overrun and ground the edge by means of a rapidly rotating grinding wheel the molding was cemented with the hydrogel tube with dimethylsulfoxide.

The working was all carried out in water-swelled state. The catheter was then washed in water and sterilized according to Example 1.

EXAMPLE 6

20 p. of acrylonitrile were dissolved in 80 p. of a 65% aqueous zinc chloride solution, the solution cooled down to −15° C, and polymerized in a glass mold consisting of two glass plates and a gasket of silicone rubber, thickness 0.5 mm, as a distance piece. The whole was held together by means of screwed clamps. The initiator consisted of 0.2 p. of potassium pyrosulfite and 0.2 p. of potassium persulfate, and the filled mold was immediately put into a cooling box with −25° C. After dismantling the mold an elastic sheet of polyacrylonitrile, plasticized with aqueous zinc chloride solution, was obtained. The sheet was divided in two equal parts which were freely hanged by one edge in a 7 l glass vessel provided with a false bottom below which 200 g of concentrated sulfuric acid was poured onto 3 g of sodium chloride and the vessel was immediately closed with a sealed lid. One half of the sheet was removed after 14 hours at 22° C, the other after 48 hours. Both of them were washed, immediately after having been taken out from the hydrogen chloride atmosphere, in a 0.5% sodium hydrocarbonate solution which was repeatedly renewed as long as a white precipitate was formed. The sheets were shortly rinsed in 0.5% nitric acid and washed in water to neutrality. The swelling capacity in water of the first sheet was 21%, that of the other 65%. The two sheets were utilized for making a partial denture by pressing them in a mold heated to 100° C. The more swellable layer formed a soft pad adhering to the palata and gum and was inseparably connected with the tough, less swellable layer in which the denture was anchored. The whole maintained its shape and size as long as it was kept wet.

EXAMPLE 7

Powdered polyacrylonitrile prepared by usual precipitation polymerization in water, average molecular weight 170,000, was dispersed in 45% nitric acid cooled to 0° C to a thick 20% dispersion. 71% nitric acid, cooled to −40° C, was then gradually added while stirring in an amount of 50% by weight of the mixture. During the homogenization, the viscosity increased rapidly. The stirring was discontinued, the viscous solution was then kept 12 hours at 25° C. Then the solution was poured slowly into an excess of tap water, the coagulate thoroughly washed and cut to 5 to 10 mm grains. The hydrogel thus obtained was transparent, yellowish, rubbery and contained, at swelling equilibrium, 71.3% of water. The grains were extruded at 100° C to form a tube with 10 mm outer diameter and 2 mm wall thickness.

EXAMPLE 8

Granular hydrogel prepared according to Example 7 was molded at 100° C in an elastic bipartite mold with a cross-section tapering to the edge, made from tombak metal alloy. The edge of the two parts was sharp to cut off the overrunning gel when the mold was closed by pressure. The pressure was caused by a spring and a screw. The mold was pre-heated to about 95° C, a piece of swelled hydrogel put in, the screw tightened and the whole immersed into boiling water for 30 seconds. Then the mold was taken out from the heating bath, the screw tightened again and the mold left to cool to ambient temperature. The molding was transparent, elastic, free of bubbles and depressions, with even, sharp edge.

EXAMPLE 9

A series of molds of the shape of corneal contact lenses was filled with blanks of hydrogel prepared according to Example 1, except that the swelling capacity at equilibrium with water of the hydrogel reached 75% of water. The concave matrix was from polytetrafluoroethylene, the die from tombak alloy with a thin sharp edge. The die was elastically pressed into the matrix during the whole molding cycle up to the cooling down. The heating was performed by infra-red irradiation, the molding temperature was 100° C. The assembly was cooled down with cold carbon dioxide gas. The cycle lasted 3 - 4 minutes, according to the thickness of the lenses.

We claim:

1. Method for manufacturing shaped articles from multi-block copolymers of acrylonitrile with acrylamide and/or acrylic acid and diacryl imide, said copolymers containing the structure of polyacrylonitrile determinable by X-ray analysis, wherein said copolymers having swelling capacities ranging from 10 to 95% of water (by weight) are formed by pressure in presence of an agent capable of swelling only the amorphous (hydrophilic) phase but incapable of dissolving the material at ambient temperature, the forming being carried out at temperatures that are higher than the glass transition point of any polymeric phase present in the system but lower than 250° C., to a shaped article with substantially unchanged structure and chemical composition.

2. Method of claim 1 wherein the copolymer is used in swelled state in which it consists of two distinct but inseparable phases, one of the crystalline or quasi-crystalline polyacrylonitrile, the other predominantly of polyacrylamide swelled with a liquid in which the polyacrylonitrile phase is not swelled.

3. Method of claim 1 wherein the swelled copolymer contains a minor amount of a solvent for polyacrylonitrile, insufficient to dissolve the copolymer at ambient temperature.

4. Method of claim 2, wherein the swelling liquid is water.

5. Method of claim 1, wherein the molding is carried out at temperatures below the boiling point of the swelling agent.

6. Method of claim 1, wherein two multi-block copolymers of acrylonitrile with different swelling capacity in water are molded together.

7. Method of claim 1, wherein the molding is carried out in a tightly closed mold, avoiding the escaping of the swelling agent.

8. Method of claim 1, wherein the molding is carried out in a tightly closed mold at temperatures which are higher than the boiling point of the swelling agent, maintaining the hydrogel under pressure during the whole cycle including the cooling.

9. Method of claim 8, wherein the molding is carried out in a tightly closed at least bipartite mold, the parts of which have an elastically deformable edge, the parts of the mold being pressed to each other during the whole molding cycle.

10. A molding manufactured by the method of claim 1.

* * * * *